United States Patent
Tamura et al.

(10) Patent No.: US 10,102,745 B2
(45) Date of Patent: Oct. 16, 2018

(54) INFORMATION PROVIDING APPARATUS FOR VEHICLE

(71) Applicant: TOYOTA JIDOSHA KABUSHIKI KAISHA, Toyota-shi, Aichi-ken (JP)

(72) Inventors: Kazuki Tamura, Susono (JP); Sayaka Ono, Susono (JP); Makoto Aso, Mishima (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/424,975

(22) Filed: Feb. 6, 2017

(65) Prior Publication Data

US 2017/0294119 A1    Oct. 12, 2017

(30) Foreign Application Priority Data

Apr. 6, 2016 (JP) .................. 2016-076831

(51) Int. Cl.
| G08G 1/00 | (2006.01) |
| G06N 7/00 | (2006.01) |
| G08G 1/09 | (2006.01) |

(52) U.S. Cl.
CPC .............. *G08G 1/091* (2013.01); *G06N 7/005* (2013.01)

(58) Field of Classification Search
CPC ......... G05D 1/0088; G05D 2201/0213; G05D 1/0278; G05D 1/0212; G05D 1/0287; G05D 1/0027; G08G 1/096805; B60W 2550/22; B60W 2710/18; G01S 13/931; G01S 19/10; G01S 2013/9353; G06F 17/30241
See application file for complete search history.

(56) References Cited

U.S. PATENT DOCUMENTS

| 9,606,539 B1* | 3/2017 | Kentley | G05D 1/0214 |
| 2010/0191433 A1* | 7/2010 | Groult | G01S 15/931 701/70 |
| 2013/0154854 A1* | 6/2013 | Chen | G08G 1/096741 340/905 |

(Continued)

FOREIGN PATENT DOCUMENTS

| JP | 2005-339181 A | 12/2005 |
| JP | 2013-544695 A | 12/2013 |
| WO | 2012/047743 A2 | 4/2012 |

*Primary Examiner* — Fekadeselassie Girma
(74) *Attorney, Agent, or Firm* — Sughrue Mion, PLLC

(57) ABSTRACT

An information providing apparatus includes a traffic information database and a data processing device. The data processing device detects, based on the traffic information data, an impediment event. The data processing device extracts the impediment event potentially encountered by an assisted vehicle. The data processing device provides a driver of the assisted vehicle with a notification regarding the impediment event potentially encountered by the assisted vehicle. The data processing device generates, based on the traffic information data, item data regarding a detailed item defined with respect to the impediment event. The data processing device generates, based on the item data, an analysis result regarding the detailed item and a confidence level of the analysis result. The data processing device changes, depending on the confidence level, contents regarding the analysis result to be included in the notification.

2 Claims, 9 Drawing Sheets

| DETAILED ITEMS | ANALYSIS RESULT |
|---|---|
| POSITION (LONGITUDINAL DIRECTION) | 500M AHEAD |
| POSITION (LATERAL DIRECTION) | FIRST LANE |
| TARGET TYPE | CARDBOARD BOX |
| SIZE | — |

HUD IMAGE:

VOICE: "THERE IS A CARDBOARD BOX IN A FIRST LANE 500 METERS AHEAD"

(56) References Cited

U.S. PATENT DOCUMENTS

| | | | |
|---|---|---|---|
| 2015/0254986 A1* | 9/2015 | Fairfield | G08G 1/22 |
| | | | 707/687 |
| 2017/0008521 A1* | 1/2017 | Braunstein | G01C 21/32 |
| 2017/0072851 A1* | 3/2017 | Shenoy | B60Q 9/008 |
| 2017/0092131 A1* | 3/2017 | Fairfield | G08G 1/161 |
| 2017/0109644 A1* | 4/2017 | Nariyambut Murali | |
| | | | G06N 7/005 |
| 2017/0132929 A1* | 5/2017 | Mays | G08G 1/161 |
| 2017/0248960 A1* | 8/2017 | Shashua | G05D 1/0212 |
| 2017/0248963 A1* | 8/2017 | Levinson | G05D 1/0278 |

* cited by examiner

<STRESS EVENT>

| EVENT EXAMPLE | BASIS FOR JUDGMENT | BASIS DATA |
|---|---|---|
| TAILGATING VEHICLE | HISTORY OF TAILGATING BEHAVIOR: INTER-VEHICLE DISTANCE, SPEED | UPLOADED DATA |
| SELF-PACED LOW-SPEED VEHICLE | HISTORY OF SPEED LIMITING BEHAVIOR: INTER-VEHICLE DISTANCE, SPEED, DIFFERENCE IN SPEED | |
| CUTTING-IN VEHICLE | HISTORY OF CUTTING-IN BEHAVIOR: LANE CHANGE OPERATION, CUTTING-IN BEHAVIOR | |
| HIGH-FREQUENCY BRAKING VEHICLE | HISTORY OF OPERATION: BRAKING FREQUENCY, SPEED, INTER-VEHICLE DISTANCE | |
| MANNER VIOLATION VEHICLE | HISTORY OF MANNER: TURN SIGNAL, RIGHT/LEFT TURN, STARTING/STOPPING | |
| NARROW ROAD | ROAD WIDTH, DIFFERENCE IN ROAD WIDTH | MAP DATA |

*Fig. 2*

<UNEXPECTED EVENT>

| TYPE | EVENT EXAMPLE | | BASIS DATA | DRIVER SITUATION | | |
|---|---|---|---|---|---|---|
| | | | | LIVING AREA | | OUTSIDE LIVING AREA |
| | | | | ACTIVITY HOUR | OFF-ACTIVITY HOUR | |
| REGULAR EVENT | DECELERATION HUMP APPEARING AROUND BLIND CURVE | | MAP DATA | EXPECTED | EXPECTED | UNEXPECTED |
| | CHRONIC TRAFFIC CONGESTION OCCURRING AROUND BLIND CURVE | | | | | |
| HOUR EVENT | DECELERATION HUMP DURING NIGHT-TIME HOURS | | MAP DATA, TIME | EXPECTED | UNEXPECTED | UNEXPECTED |
| | CHRONIC TRAFFIC CONGESTION ON HOLIDAY | | | | (I) | (I) |
| | CHRONIC TRAFFIC CONGESTION DURING COMMUTING HOURS | | | | | |
| LOW FREQUENCY EVENT | OCCURRENCE TIME IS BIASED TO SPECIFIC SEASON | ANIMAL | UPLOADED DATA | UNEXPECTED | | |
| | | POT HOLE ON ROAD | | | | |
| | OCCURRENCE INTERVAL IS LONG | DISABLED VEHICLE | | (II) | (II) | (II) |
| | | FALLEN OBJECT (E.G. TIRE) | | | | |
| LOW PROBABILITY EVENT | TRAFFIC SIGNAL THAT SELDOM TURNS RED | | | (III) | (III) | EXPECTED |

*Fig. 3*

| DETAILED ITEMS | ANALYSIS RESULT |
|---|---|
| POSITION (LONGITUDINAL DIRECTION) | 500M AHEAD |
| POSITION (LATERAL DIRECTION) | FIRST LANE |
| TARGET TYPE | CARDBOARD BOX |
| SIZE | — |

HUD IMAGE:

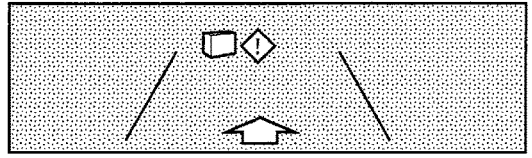

VOICE: "THERE IS A CARDBOARD BOX IN A FIRST LANE 500 METERS AHEAD"

*Fig. 6*

| DETAILED ITEMS | ANALYSIS RESULT |
|---|---|
| POSITION (LONGITUDINAL DIRECTION) | AHEAD |
| POSITION (LATERAL DIRECTION) | UNCLEAR |
| TARGET TYPE | OBSTACLE |
| SIZE | — |

HUD IMAGE:

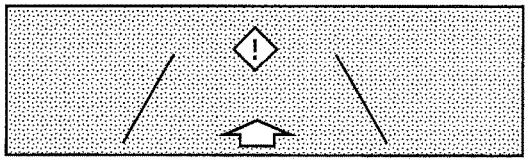

VOICE: "THERE IS AN OBSTACLE AHEAD"

*Fig. 7*

INFORMATION PROVIDING APPARATUS FOR VEHICLE

BACKGROUND

Technical Field

The present invention relates to an information providing apparatus for a vehicle. In particular, the present invention relates to an information providing apparatus for a vehicle that provides a driver of an assisted vehicle with a notification regarding an impediment event.

Background Art

Patent Literature 1 discloses a system for supporting autonomous traveling of a vehicle. A travel route of the vehicle includes not only a zone suitable for the autonomous traveling but also a zone in which the autonomous traveling is hard to carry out. For example, a general region of an expressway in which all surrounding vehicles move in the same direction to go with a flow of traffic is the zone suitable for the autonomous traveling. On the other hand, a junction where a plurality of vehicle flows merge, a roundabout intersection, a complicated grade separation and the like are the zones in which the autonomous traveling is hard to carry out.

The above-mentioned conventional system is based on premise that a driver sets a destination prior to start of the autonomous traveling. When the destination is set, the vehicle calculates a route from the current location to the destination. When the vehicle runs along the calculated route and approaches the zone in which the autonomous traveling is hard to carry out, the vehicle notifies the driver of the approach to the zone. The driver receiving the notification can supplement the autonomous traveling by setting a new route bypassing the zone or manually operating the vehicle during passing through the zone.

LIST OF RELATED ART

Patent Literature 1: JP 2013-544695 A
Patent Literature 2: JP 2005-339181 A

SUMMARY

According to the system disclosed in Patent Literature 1, the "zone in which the autonomous traveling is hard to carry out" is recorded in a map data. The following three methods are disclosed as a method for the recording.

1. It is recorded in advance at a time when the map data is generated.
2. The driver of the vehicle records it.
3. A zone provided from another vehicle through a V2V (Vehicle-to-Vehicle) communication is recorded.

In any case, only a zone that obviously exists is recorded in the map data of Patent Literature 1. Therefore, according to the system disclosed in Patent Literature 1, no notification regarding an non-existent event is provided to the driver.

An impediment event that can be impediment to vehicle running can be detected also by collecting behavior data from vehicles running in streets and analyzing the collected data. For example, if a fallen object exists on an expressway, a large number of vehicles take avoidance actions at a location of the fallen object. Therefore, if a large number of vehicles take avoidance actions at a certain location, it is possible to judge that some impediment event is occurring at that location.

From a viewpoint of assisting vehicle driving, it is considered to provide the driver with a notification regarding such the impediment event before the driver encounters the impediment event. If the driver of the vehicle receives such the notification, the driver can prepare for the impediment event and thus handle the event well in advance.

When the impediment event is detected by analyzing the collected data, it becomes easier to grasp details of the impediment event as the number of data becomes larger. There are some impediment events where notifying the detailed contents thereof is more useful for the driver of the vehicle than notifying only a summary thereof. As an example, let us consider a case where there is a fallen object such as a tire on an expressway. In this case, the driver can handle the event more easily when receiving a notification that "there is a cardboard box in a first lane 500 meters ahead" than when receiving a notification that "there is an obstacle ahead".

The system disclosed in Patent Literature 1 does not have a function of continuing to collect information on the zone in which the autonomous traveling is hard to carry out. Therefore, according to the system, a notification regarding the zone is uniform. In view of the above, the system disclosed in Patent Literature 1 leaves scope for improvement of a function of providing information regarding the impediment event to assist the driver of the vehicle.

The present invention has been made to solve the problem described above. An object of the present invention is to provide an information providing apparatus for a vehicle that can change, depending on contents of known information, contents of a notification regarding an impediment event to be notified to a driver.

A first invention has the following features in order to achieve the object described above. The first invention is an information providing apparatus for a vehicle, including:

a traffic information database in which traffic information data are recorded; and a data processing device configured to process the traffic information data to provide a driver of an assisted vehicle with a notification.

The data processing device is configured to execute:

an event detection process that detects, based on the traffic information data, an impediment event that impediments vehicle running;

an event extraction process that extracts the impediment event potentially encountered by the assisted vehicle;

a notification process that provides the driver with the notification regarding the impediment event potentially encountered by the assisted vehicle;

a process of generating, based on the traffic information data, item data regarding a detailed item defined with respect to the impediment event;

a process of generating, based on the item data, an analysis result regarding the detailed item and a confidence level of the analysis result; and a process of changing, depending on the confidence level, contents regarding the analysis result to be included in the notification.

A second invention has the following features in the first invention.

The data processing device is further configured to execute a traffic information recording process that records, in the traffic information database, the traffic information data received from an information providing vehicle.

A third invention has the following features in the second invention.

The traffic information data includes: positional information of the information providing vehicle; and vehicle behavior information of the information providing vehicle.

A fourth invention has the following features in the second or third invention.

The traffic information data includes: positional information of the information providing vehicle; and a result of detection by a surrounding monitoring sensor that is installed in the information providing vehicle for monitoring a surrounding situation.

A fifth invention has the following features in any one of the first to fourth inventions.

The data processing device is further configured to execute a determination value calculation process that calculates a notification necessity level for each of the impediment event.

The notification process provides the driver with the notification regarding the impediment event having the notification necessity level greater than a notification threshold.

A sixth invention has the following features in any one of the first to fifth inventions.

The data processing device is further configured to execute a certainty level calculation process that calculates, based on the traffic information data, a certainty level of the impediment event.

The notification process provides the driver of the assisted vehicle with the notification regarding the impediment event having the certainty level greater than an assistance threshold.

A seventh invention has the following features in any one of the first to sixth inventions.

The analysis result is determined based on an average value of values respectively corresponding to the item data.

An eighth invention has the following features in any one of the first to seventh inventions.

The confidence level is calculated to be a higher value as a number of the item data regarding the detailed item becomes larger.

A ninth invention has the following features in any one of the first to eighth inventions.

The item data is given reliability depending on a data type.

The item data whose reliability is higher is more reflected in the confidence level as compared with the item data whose reliability is lower.

A tenth invention has the following features in any one of the first to ninth inventions.

The confidence level is calculated to be a higher value as a variation of values respectively corresponding to the item data becomes smaller.

An eleventh invention has the following features in any one of the eighth to tenth inventions.

The data processing device is further configured to calculate a move possibility for each of the impediment event.

The confidence level with regard to the detailed item related to a position is calculated to be a lower value as the move possibility of the impediment event becomes higher.

A twelfth invention has the following features in any one of the eighth to eleventh inventions.

The data processing device is further configured to calculate an elapsed time from previous detection for each of the impediment event.

The confidence level is calculated to be a lower value as the elapsed time from previous detection of the impediment event becomes longer.

A thirteenth invention has the following features in any one of the eighth to twelfth inventions.

The data processing device is further configured to calculate a frequency of encounter by vehicles for each of the impediment event.

The confidence level is increased when the frequency of encounter regarding the impediment event is maintained or increased, while the confidence level is decreased when the frequency of encounter is decreased.

A fourteenth invention has the following features in any one of the first to thirteenth inventions.

The process of changing the contents includes:

a process of determining, with regard to the impediment event to be notified, whether or not the confidence level is equal to or greater than a confidence threshold for each of the detailed item; and a process of generating the notification so as to include the analysis result regarding the detailed item whose confidence level is equal to or greater than the confidence threshold.

According to the first invention, it is possible to provide the driver of the assisted vehicle with the notification regarding the impediment event potentially encountered by the assisted vehicle. Moreover, according to the first invention, the analysis result and its confidence level can be generated with regard to the detailed item defined with respect to the impediment event. By changing, depending on the confidence level, the contents of information to be included in the notification, it is possible to provide detailed information within a scope which does not betray the driver's trust.

According to the second invention, the data processing device can obtain the traffic information data from the information providing vehicle and records the obtained traffic information data in the traffic information database. The information providing vehicle preceding the assisted vehicle can transmit, to the data processing device, information of the impediment event occurring on a travel route of the assisted vehicle. Accordingly, the data processing device can provide the assisted vehicle with the notification regarding the impediment event with which the assisted vehicle does not yet encounter.

According to the third invention, the information providing vehicle transmits its positional information and vehicle behavior information as the traffic information data. The data processing device can recognize occurrence of the impediment event by referring to the vehicle behavior information indicating an avoidance action for example. Moreover, the data processing device can recognize a position of occurrence of the impediment event by referring to the positional information of the information providing vehicle. Therefore, according to the third invention, it is possible to notify the assisted vehicle of the information regarding the impediment event encountered by the information providing vehicle in real time.

According to the fourth invention, the information providing vehicle transmits its positional information and the result of detection by the surrounding monitoring sensor as the traffic information data. The data processing device can detect, based on the result of detection by the surrounding monitoring sensor, the impediment event that occurs around the information providing vehicle. Moreover, the data processing device can recognize a position of occurrence of the impediment event by referring to the positional information of the information providing vehicle. Therefore, according to the fourth invention, it is possible to notify the assisted vehicle of the details of the impediment event encountered by the information providing vehicle in real time.

According to the fifth invention, it is possible to provide the driver with only the notification regarding the impediment event whose notification necessity level is high. Therefore, according to the fifth invention, it is possible to suppress possibility that the driver finds the received notification annoying.

According to the sixth invention, it is possible to prevent the impediment event whose certainty level is low from being notified to the driver. Therefore, according to the sixth invention, it is possible to enhance reliability of the notification.

According to the seventh invention, the analysis result is determined based on the average value of respective values of item data. According to this method, it is possible to utilize the plurality of item data without wasting them to obtain a suitable analysis result.

According to the eighth invention, the confidence level is calculated to be a higher value as the number of the item data becomes larger. Certainty of the analysis result increases as the number of basis data becomes larger. According to the eighth invention, it is possible to calculate the confidence level to be consistent with the certainty.

According to the ninth invention, it is possible to reflect the reliability of each item data in the confidence level of the analysis result. Therefore, according to the ninth invention, it is possible to calculate the confidence level appropriately without wasting the value of the data having the high reliability.

According to the tenth invention, the confidence level is calculated to be a higher value as the variation of the item data becomes smaller. A probability that conclusion derived from a plurality of data is correct becomes lower as a variation of the data becomes smaller. According to the tenth invention, it is possible to calculate the confidence level to be consistent with the probability.

According to the eleventh invention, the confidence level related to a position is calculated to be a lower value as the move possibility of the impediment event becomes higher. An obstacle whose move possibility is high such as an animal is likely to change its position as time goes on. Therefore, the analysis result regarding the detailed item related to the position is likely to be instable as the move possibility of the impediment event becomes higher. According to the eleventh invention, it is possible to reflect the instability in the confidence level related to the position.

According to the twelfth invention, the confidence level with regard to an impediment event is calculated to be a lower value as the elapsed time from previous detection of the impediment event becomes longer. A possibility that the impediment event after detection has disappeared becomes higher as time goes on. According to the twelfth invention, it is possible to reflect the possibility of disappearance in the confidence level.

According to the thirteenth invention, it is possible to reflect the frequency that the vehicle encounters the impediment event in the confidence level with regard to the impediment event. If an impediment event detected at a certain location continues to be repeatedly encountered by other vehicles thereafter, an existing probability of the impediment event can be judged to be high. On the other hand, if an impediment event is once detected and thereafter the frequency of encounter by the vehicle has decreased, the existing probability of the impediment event can be judged to be lowered. According to the thirteenth invention, it is possible to reflect change in the existing probability in the confidence level with regard to the impediment event.

According to the fourteenth invention, it is possible to include the analysis result whose confidence level is high in the notification to be provided to the driver of the assisted vehicle. Since the contents whose confidence level is low are not included in the notification, it is possible to lessen the chances of betraying the driver's trust. Moreover, since the contents whose confidence level is high are included in the notification, it is possible to increase usefulness of the notification for the driver.

BRIEF DESCRIPTION OF DRAWINGS

FIG. 2 is a diagram showing concrete examples of a stress event shown in FIG. 1;

FIG. 3 is a diagram showing concrete examples of an unexpected event shown in FIG. 1;

FIG. 6 is a diagram for explaining an example of a notification regarding an impediment event whose details are revealed;

FIG. 7 is a diagram for explaining an example of a notification regarding an impediment event whose details are not yet revealed;

EMBODIMENTS

Overview of Embodiments of Present Invention

An object of embodiments of the present invention is to assist a driver of a vehicle through provision of information. The vehicle as an assistance target is hereinafter referred to as an "assisted vehicle". Various events occur on a travel route of the assisted vehicle. The various events include a stress event, an unexpected event, and an expected event. The stress event is an event that gives great stress to the driver encountering the event and is exemplified by another vehicle having a tendency to tailgate and another vehicle having a tendency to frequently apply a brake. The unexpected event is exemplified by a separated wheel that cannot be recognized until just before encounter. The expected event is exemplified by a usual traffic congestion that occurs everyday.

In general, the driver notified of assistance information welcomes a notification of useful information but finds a notification of useless information annoying. Specifically, notifications of the stress event and the unexpected event among the above-mentioned examples are likely to be welcomed by the driver. On the other hand, the expected event is already known by the driver and thus a notification of the expected event is likely to be annoying. Therefore, according to the embodiments of the present invention, an event to be notified to the driver of the assisted vehicle is limited to the stress event and the unexpected event among the above-mentioned examples, while the expected event is eliminated from the event to be notified. It should be noted that the stress event and the unexpected event are just examples of the event to be notified. An event having a high level of notification necessity also can be appropriately added to the event to be notified.

Figure 1:
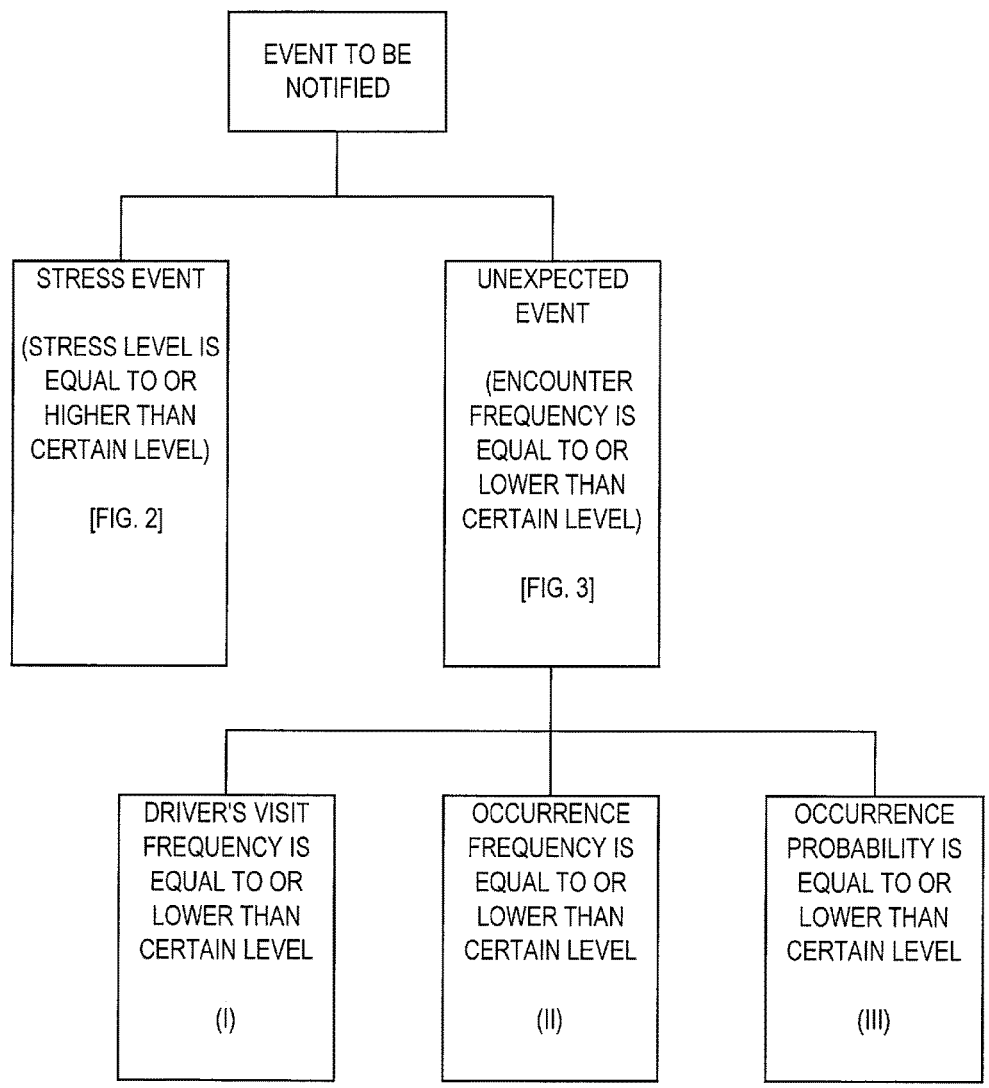
FIG. 1 is a diagram for explaining an overview of an event to be notified to a driver of an assisted vehicle in the present invention.

FIG. 1 is a diagram for explaining an overview of the event to be notified in the embodiments of the present invention. According to the embodiments of the present invention, as shown in FIG. 1, the event to be notified consists of the stress event and the unexpected event. Details of the event to be notified will be described hereinafter with reference to FIGS. 2 and 3 together with FIG. 1.

FIG. 2 is a diagram for explaining concrete examples of the stress event.

A first concrete example is a "tailgating vehicle".

(Definition) The "tailgating vehicle" refers to a vehicle that frequently performs a tailgating behavior that closes a distance to a preceding vehicle to urge the preceding vehicle.

(Basis for judgment) Whether or not a vehicle meets the definition of the "tailgating vehicle" can be judged based on a history of the tailgating behavior of the vehicle. Whether or not a vehicle is performing the tailgating behavior can be judged based on speeds of the vehicle and the preceding vehicle, a distance between the vehicle and the preceding vehicle, and so forth.

(Basis data) The judgment regarding the tailgating behavior can be performed based on uploaded data from the vehicle such as positional information, speed information, and inter-vehicle distance information.

A second concrete example is a "self-paced low-speed vehicle".

(Definition) The "self-paced low-speed vehicle" refers to a vehicle that keeps on running at an obviously lower speed than surrounding or following vehicles.

(Basis for judgment) Whether or not a vehicle meets the definition of the "self-paced low-speed vehicle" can be judged based on a history of a speed limiting behavior that limits a speed of a following vehicle group under a condition that there is no preceding vehicle. Whether or not a vehicle is performing the speed limiting behavior can be judged based on distances between the vehicle and the preceding and following vehicles, a speed of the vehicle, differences in the speed between the vehicle and the surrounding vehicles, a difference in the speed between the vehicle and the following vehicle until the following vehicle closes the distance, the number of following vehicles, and so forth.

(Basis data) The judgment regarding the speed limiting behavior can be performed based on uploaded data from the vehicle such as the positional information, the speed information, and the inter-vehicle distance information.

A third concrete example is a "cutting-in vehicle".

(Definition) The "cutting-in vehicle" refers to a vehicle that frequently performs a cutting-in behavior that cuts in between vehicles in a lane adjacent to the running lane.

(Basis for judgment) Whether or not a vehicle meets the definition of the "cutting-in vehicle" can be judged based on a history of the cutting-in behavior of the vehicle. Whether or not a vehicle is performing the cutting-in behavior can be judged based on a lane change operation in the vehicle, a behavior of a nearby vehicle in the adjacent lane, and so forth.

(Basis data) The lane change operation can be detected based on uploaded data from the vehicle such as steering information, accelerator operation information, brake operation information, the positional information, and the speed information. The behavior of the nearby vehicle due to the cutting-in can be detected based on uploaded data from the nearby vehicle such as positional information, vehicle speed information, and inter-vehicle distance information.

A fourth concrete example is a "high-frequency braking vehicle". (Definition) The "high-frequency braking vehicle" refers to a vehicle that frequently performs a brake operation. Such the frequent brake operation is likely to be performed by a driver having a tendency to drive the vehicle with closing the distance to the preceding vehicle. When a vehicle follows the high-frequency braking vehicle, a driver of the following vehicle is likely to feel stress because the driver needs to frequently pay attention to the brake operation of the preceding vehicle.

(Basis for judgment) Whether or not a vehicle meets the definition of the "high-frequency braking vehicle" can be judged based on a history of operations in the vehicle. More specifically, whether or not a vehicle meets the definition of the "high-frequency braking vehicle" can be judged based on a frequency of the brake operation in the vehicle, a vehicle speed at the time when the brake operation is performed, the distance to the preceding vehicle, and so forth.

(Basis data) The above-mentioned judgment can be performed based on uploaded data from the vehicle such as the brake operation information, the positional information, the speed information, and the inter-vehicle distance information.

A fifth concrete example is a "manner violation vehicle".

(Definition) The "manner violation vehicle" refers to a vehicle that frequently repeats a manner violation behavior. Here, the "manner violation behavior" is exemplified by a right or left turn without giving a turn signal, stop on a side of a road, start from the side of the road, and so forth.

(Basis for judgment) Whether or not a vehicle meets the definition of the "manner violation vehicle" can be judged based on a history of the manner violation behavior of the vehicle. The "manner violation behavior" can be detected based on operations in the vehicle such as a turn signal operation, a right or left turn operation, an operation of stopping on the side of the road, and an operation of starting from the side of the road.

(Basis data) The above-mentioned detection can be performed based on uploaded data from the vehicle such as a variety of operation information, the positional information, the speed information, and the inter-vehicle distance information.

A sixth concrete example is a "narrow road".

(Definition) The "narrow road" refers to a road whose width is narrow. At an entrance to the narrow road, a driver is likely to feel stress due to decrease in the road width. Moreover, during driving through the narrow road, the driver needs to pay a great deal of attention to the road width and is thus likely to feel stress.

(Basis for judgment) Whether the vehicle approaches the narrow road can be judged based on the road width or a difference in the road width.

(Basis data) The above-mentioned judgment can be performed based on map data that is prepared in advance.

Referring back to FIG. 1, the "unexpected event" in the embodiments of the present invention will be described next. In the embodiments of the present invention, the "unexpected event" refers to the impediment event whose frequency of encounter by the driver is equal to or less than a certain level. The impediment event whose frequency of encounter is equal to or lower than a certain level can be classified into three categories (I), (II), and (III) as shown in FIG. 1.

The first category (I) includes the following impediment event; that is, a frequency of visit by the driver to a location of occurrence of the impediment event is equal to or lower than a certain level, and accordingly the frequency of encounter with the impediment event is low. Specifically, the impediment event itself occurs steadily or frequently, but the driver seldom visits the location of occurrence of the impediment event.

The second category (II) includes the impediment event whose frequency of occurrence is equal to or lower than a certain level. The impediment event belonging to the category (II) can be further classified into the following two categories.

(II-i) The impediment event whose occurrence time is biased to a certain time. In other words, the impediment event whose period of occurrence within a defined period of time is less than a threshold. For example, a deer appearing only during a certain season corresponds to this category.

(II-ii) The impediment event whose number of occurrences within a defined period of time is less than a threshold. Or, the impediment event whose interval of occurrence (i.e. an elapsed time from the previous occurrence) at the location of occurrence is equal to or more than a threshold. For example, a separated wheel left on a lane of an expressway corresponds to this category.

The third category (III) includes the impediment event whose frequency of occurrence is not so low but whose probability of occurrence is lower than a threshold. For example, a traffic signal that seldom turns red corresponds to this category.

FIG. 3 is a diagram for explaining concrete examples of the unexpected event. In FIG. 3, the unexpected event is classified into four types depending on characteristics.

A first type is a "regular event". The regular event is the impediment event that is always present at a specific location.

(Event Example)

For example, a deceleration hump appearing around a blind curve, and a chronic traffic congestion occurring around a blind curve belong to the first type.

(Basis Data)

This type of event can be detected based on uploaded data from individual vehicles and a traffic information infrastructure. Alternatively, this type of event, which is always present at a specific location, can also be detected based on a map data in which its information is registered. The vehicle and infrastructure that upload the data are hereinafter collectively referred to as "information providing vehicle and the like".

(Driver Situation)

The regular event is a daily event for a driver whose living area includes a location of occurrence of the regular event. Therefore, in a case where the target of assistance is the driver within the living area, it is reasonable to treat the regular event as the expected event. On the other hand, the regular event is not a daily event for a driver outside the living area such as a driver who visits the location of occurrence of the regular event during the trip. Therefore, according to the embodiments of the present invention, the regular event is treated as the unexpected event for the driver outside the living area. This treatment corresponds to the category (I) shown in FIG. 1.

A second type shown in FIG. 3 is an "hour event". The hour event is the impediment event that routinely occurs at a specific location during specific hours.

(Event Example)

For example, a deceleration hump that can be easily seen from a long distance during daytime hours but is hard to recognize and thus becomes the impediment event during night-time hours, chronic traffic congestion that occurs at a specific location only on a holiday, and chronic traffic congestion that occurs at a specific location only during commuting hours belong to the second type.

(Basis Data)

The hour event fixed on a road such as the deceleration hump can be detected based on time information and the uploaded data from the information providing vehicle and the like or the map data in which information of the hour event fixed on the road is registered. On the other hand, the hour event such as the chronic traffic congestion can be detected based on the uploaded data from the information providing vehicle and the like.

(Driver Situation)

The hour event is a daily event for a driver whose living area includes a location of occurrence of the hour event and whose activity hour (i.e. time of visit to the location of occurrence) overlaps an hour of occurrence of the hour event. Therefore, with respect to the driver whose living area and activity hour respectively overlap the location of occurrence and the hour of occurrence of the hour event, it is reasonable to treat the hour event as the expected event. On the other hand, the hour event is not a daily event for a driver whose living area includes the location of occurrence of the hour event but whose activity hour does not overlap the hour of occurrence of the hour event. Similarly, the hour event is not a daily event for a driver outside the living area. Therefore, according to the embodiments of the present invention, the hour event is treated as the unexpected event for the driver during off-activity hour and the driver outside the living area. This treatment corresponds to the category (I) shown in FIG. 1.

A third type shown in FIG. 3 is a "low frequency event". The "low frequency event" corresponds to the impediment event that belongs to the category (II) shown in FIG. 1.

(Event Example)

For example, an animal (typically, a deer) that appears intensively during a certain season, and a pot hole that appears on a road intensively at a thawing season belong to the third type (especially the above-mentioned category (II-i)). Moreover, a disabled vehicle stopping on a road, and a separated wheel left on an expressway also belong to the third type (especially the above-mentioned category (II-ii)).

(Basis Data)

The impediment event belonging to the low frequency event can be detected based on the uploaded data from the information providing vehicle and the like.

(Driver Situation)

The low frequency event is not a daily event for any driver. Therefore, according to the embodiments of the present invention, the low frequency event is treated as the unexpected event for all the drivers.

A fourth type shown in FIG. 3 is a "low probability event". The "low probability event" corresponds to the impediment event that belongs to the category (III) shown in FIG. 1. More specifically, the low probability event refers to the impediment event that is realized with an extremely low probability in an on-road fixed object installed at a specific location. The on-road fixed object belongs to a population consisting of a large number of the same kind of on-road fixed objects. Each of the on-road fixed objects belonging to the population operates to switch its state between a plurality of states. One of the plurality of states causes the impediment event that impediments the vehicle running. Since the large number of on-road fixed objects belonging to the population behave in a similar manner, the driver understands that each of the on-road fixed objects can cause the impediment event with a certain probability. Under the circumstances, let us consider a case where only a specific on-road fixed object operates to cause the impediment event with a remarkably lower probability as compared with other on-road fixed objects. In this case, a driver familiar with the operation of the specific on-road fixed object comes to have a preconceived idea that the specific on-road fixed object would not cause the impediment event. Under this situation, the impediment event caused by the specific on-road fixed object is the unexpected event for the driver.

(Event Example)

For example, a vehicle actuated traffic signal that is installed on a highway and seldom turns red belongs to the fourth type.

(Basis Data)

The impediment event belonging to the low probability event can be detected based on the uploaded data from the information providing vehicle and the like (including the on-road fixed object itself).

(Driver Situation)

The low probability event is the unexpected event for the driver having the preconceived idea that the specific on-road fixed object seldom causes the impediment event. However, the low probability event may be an expected event for the driver outside the living area who does not have such the preconceived idea. Therefore, according to the embodiments of the present invention, the low probability event may be excluded from the unexpected event in the case of the driver outside the living area, although the low probability event is treated as the unexpected event at least for the driver within the living area.

[Analysis of Uploaded Data]

As described above, many of the "stress events" are detected by analyzing the uploaded data from the vehicles. Also, many of the "unexpected events" are detected based on the uploaded data from the information providing vehicle and the like. When necessary data are uploaded, it is possible by analyzing the uploaded necessary data in detail to detect not only presence but also details of the impediment event.

For example, when a fallen object exists at a certain position, the data of the avoidance action and the positional information are uploaded from vehicles passing by the certain position. The positional information includes an error to some extent. Therefore, under a situation where only one positional information data is available, it is necessary to expect a considerable error in the position of the fallen object. However, when a sufficient number of positional information data are collected, the data form a distribution having an average value and a dispersion. If the sufficient number of data exhibit a sufficiently small dispersion, it is possible to judge that the average value of the distribution is likely to indicate the position of the fallen object. The same applies to a size and a type of the fallen object. If a large number of data are collected and a dispersion of a distribution of the data is small, it is possible to estimate that an average value of the distribution is the size of the fallen object.

In view of the above, when the impediment event is detected by analyzing a large number of uploaded data, detailed information that cannot be determined when the number of data is small can become clearer as the number of data increases. If the detailed information is correct, it is preferable to provide the driver of the assisted vehicle with the detailed information of the impediment event. For example, the driver can prepare for the impediment event more easily when receiving a notification that "there is a cardboard box about 80 cm on a side, in a passing lane 500 meters ahead" than when receiving a notification that "there is some obstacle ahead".

Therefore, according to the present embodiment, a system is designed to execute the following processes after the impediment event that should be notified to the driver is detected.

1. continuously collect the uploaded data regarding detailed items (for example, position, size, and material) of the impediment event;

2. analyze the uploaded data to obtain the analysis result and calculate a confidence level of the analysis result, with respect to each of the detailed items;

3. exclude the analysis result whose confidence level is less than a threshold from the contents of the notification;

4. include the analysis result whose confidence level is equal to or greater than the threshold in the contents of the notification; and 5. generate the notification to be provided to the driver, according to the determination of the above 3 and 4.

As a result, according to the system of the present embodiment, when the impediment event that should be notified to the driver is detected, the contents of the notification provided to the driver typically changes as follows as time goes by.

(at a timing immediately after occurrence of impediment event): notification that informs a summary of the impediment event.

(at a timing when a sufficient time has passed since occurrence): notification including the detailed information of the impediment event.

First Embodiment

Configuration of First Embodiment

Figure 4:
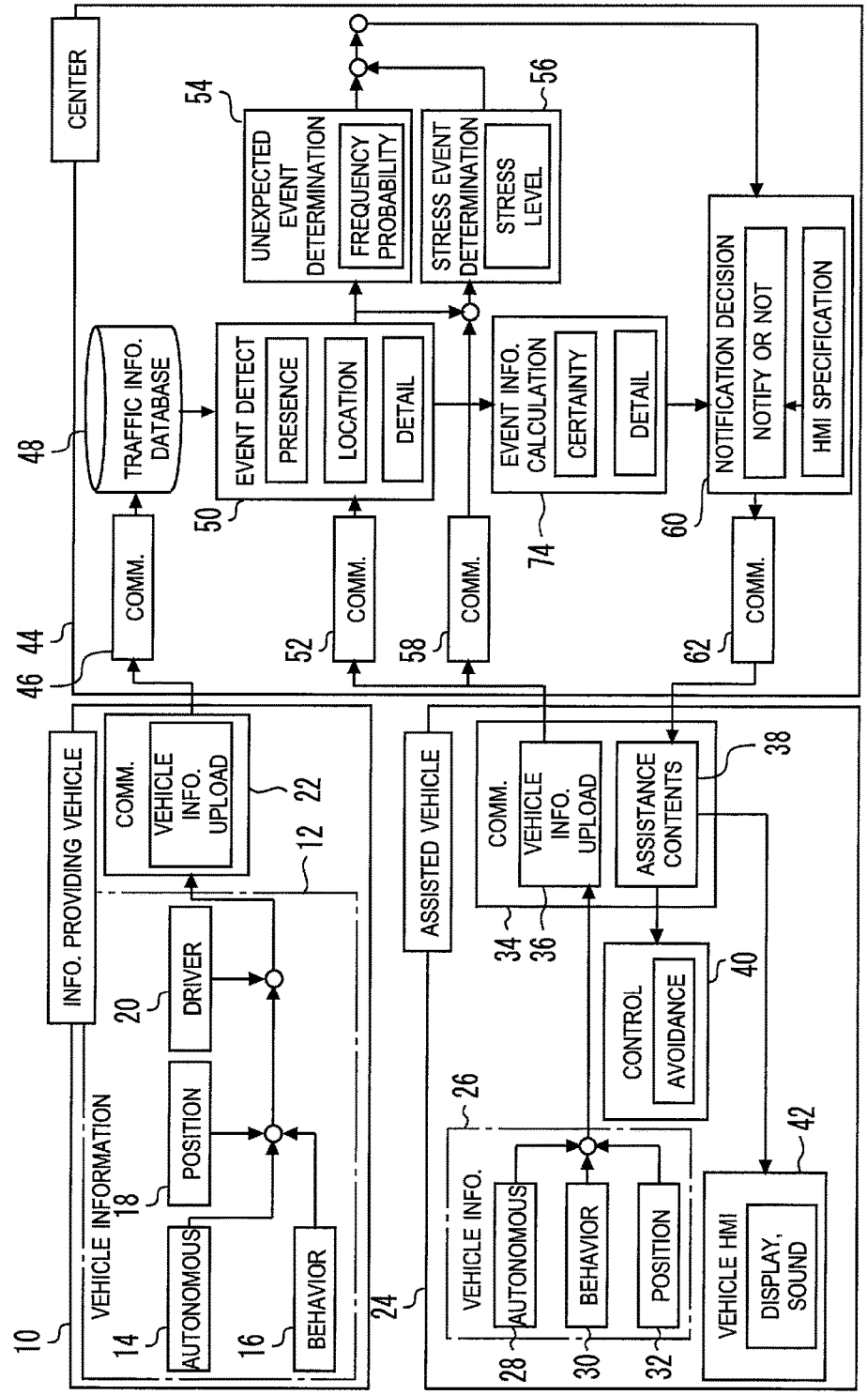
FIG. 4 is a block diagram for explaining a configuration of a first embodiment of the present invention.

FIG. 4 is a diagram for explaining a configuration of an information providing apparatus for a vehicle according to a first embodiment of the present invention. As shown in FIG. 4, a system of the present embodiment includes an information providing vehicle 10. Although a single information providing vehicle 10 only is shown in FIG. 4 for the sake of convenience, there are practically a lot of information providing vehicles 10. In the present system, the information providing vehicle 10 plays a role of a supply source of a variety of information obtained on a road. An information supply source in the present embodiment includes not only the information providing vehicle 10 but also various infrastructures such as a sensor for detecting amount of traffic and a monitoring camera (not shown) that can obtain traffic information. The information providing vehicle 10 and those infrastructures are hereinafter collectively referred to as "information providing vehicle and the like".

The information providing vehicle 10 has a vehicle information unit 12. The vehicle information unit 12 is a unit that obtains a variety of information regarding the information providing vehicle 10. The vehicle information unit 12 includes an autonomous sensor unit 14. The autonomous sensor unit 14 includes a surrounding monitoring sensor for detecting information required for autonomous traveling of the information providing vehicle 10. More specifically, the autonomous sensor unit 14 includes surrounding monitoring sensors such as a millimeter-wave radar, a laser radar, an on-vehicle camera. By using the millimeter-wave radar and the laser radar, it is possible to detect presence of objects including other vehicles, distances to the objects, and so forth. By using the on-vehicle camera, it is possible to recognize white lines, pedestrians, bicycles and so forth on the road.

The vehicle information unit 12 further includes a vehicle behavior unit 16. The vehicle behavior unit 16 includes a variety of sensors for detecting a behavior of the information providing vehicle 10. For example, the vehicle behavior unit 16 can detect a speed, an acceleration, a yaw rate, an accelerator opening, a brake oil pressure, a steering angle, a steering angular velocity, and so forth.

The vehicle information unit 12 further includes a positional information unit 18. The positional information unit 18 includes a GPS (Global Positioning System) device. By using the positional information unit 18, it is possible to detect a position of the information providing vehicle 10. Moreover, some information providing vehicles 10 are provided with a system (hereinafter referred to as a "locator") for detecting the vehicle position based on various information that can be detected on the vehicle. The vehicle position detected by the locator is more precise as compared with that detected by the GPS device. By using the locator, it is possible to identify a travel lane in which the vehicle is running among a plurality of lanes of the road.

The vehicle information unit 12 further includes a driver information unit 20. The driver information unit 20 includes an input interface for receiving driving skill information self-reported by a driver or a unit for diagnosing a driving skill of the driver. Here, the driving skill of the driver can be judged by a well known method based, for example, on a jerk of the vehicle, namely a differential value da/dt of the acceleration a. Moreover, the driver information unit 20 includes an input interface for receiving various settings and requests from the driver.

A variety of vehicle information detected by the vehicle information unit 12 is supplied to the communication unit 22. The communication unit 22 has a communication function for uploading the vehicle information.

The system of the present embodiment further includes an assisted vehicle 24 in addition to the above-described information providing vehicle 10. The assisted vehicle 24 has a vehicle information unit 26 for detecting information regarding the assisted vehicle 24. In the present embodiment, the vehicle information unit 26 of the assisted vehicle 24 includes an autonomous sensor unit 28, a vehicle behavior unit 30, and a positional information unit 32. These functions are similar to those of the information providing vehicle 10, and an overlapping description thereof is omitted here.

The assisted vehicle 24 has a communication unit 34 that receives detected information supplied from the vehicle information unit 26. The communication unit 34 includes a vehicle information upload unit 36 for uploading a variety of detected information received from the vehicle information unit 26 to the outside of the assisted vehicle 24. Moreover, the communication unit 34 includes an assistance contents reception unit 38 for receiving assistance contents supplied from the outside of the assisted vehicle 24.

The assistance contents that the assistance contents reception unit 38 externally receives include an avoidance control instruction and a notification instruction. The avoidance control instruction is supplied to a control unit 40 of the assisted vehicle 24. The control unit 40 has a function of achieving a variety of avoidance controls in accordance with the avoidance control instruction. Here, the avoidance control refers to a control that controls a driving force, a braking forth of each wheel, a steering angle and the like to cause the assisted vehicle 24 to take necessary actions for avoiding the impediment event.

The notification instruction is supplied from the assistance contents reception unit 38 to a vehicle HMI (Human Machine Interface) unit 42. The vehicle HMI unit 42 is an interface for notifying the driver of the assisted vehicle 24 of the instructed notification. More specifically, the vehicle HMI unit 42 executes display/sound/audio control for proving the driver with the notification through display, sound, and audio.

The system of the present embodiment further includes a center 44 that processes the uploaded data from the information providing vehicle and the like and the assisted vehicle 24, and provides the assisted vehicle 24 with the assistance contents. The center 44 has a storage device, a processor, an input-output interface, a communication device and so forth.

More specifically, the center 44 includes a communication unit 46 that receives the uploaded data from the information providing vehicle and the like. The data received by the communication unit 46 are recorded in a traffic information database 48. Specifically, the following two kinds of traffic information data are uploaded to the traffic information database 48.

1. Data regarding the driver of the information providing vehicle 10

(Contents) The driver skill that is self-reported or diagnosed.

The settings by the driver and the requests from the driver

2. Data regarding the impediment event.

(Contents) "Event data" indicating an event whose presence and details are identified based on images obtained by the on-vehicle camera and the like.

"Base data" used for determining presence and details of an event, such as the vehicle behavior of the information providing vehicle 10 and a result of measurement by the millimeter-wave radar.

"Positional information" indicating a location of occurrence of the information.

The data accumulated in the traffic information database 48 are supplied to an event detection unit 50 of the center 44. The event detection unit 50 performs the following processing based on the above-mentioned 2. "data regarding the impediment event".

(1) detecting, based on the above-mentioned "event data", the impediment event.

(2) detecting, based on the above-mentioned "base data", an event that can be estimated to be the impediment event (this kind of event also is hereinafter referred to as the "impediment event").

(3) identifying, based on the above-mentioned "positional information", a location of each impediment event detected by the above-mentioned Steps (1) and (2).

The positional information of the assisted vehicle 24 also is supplied to the event detection unit 50 through a communication unit 52. The event detection unit 50 further performs the following processing based on the positional information.

(4) estimating a travel route of the assisted vehicle 24.

(5) extracting the impediment event existing on the travel route estimated by the above-mentioned Step (4) from the impediment events whose locations are identified by the above-mentioned Step (3).

By performing the above-described processing (1) to (5), the event detection unit 50 can detect the impediment event which the assisted vehicle 24 is likely to encounter from now.

The data regarding the impediment event detected by the event detection unit 50 is supplied to an unexpected event determination unit 54. The unexpected event determination unit 54 executes a frequency determination process and a probability determination process in order to determine whether or not the impediment event corresponds to an unexpected event. In the frequency determination process, it is determined whether or not the event detected by the event detection unit 50 corresponds to an event whose occurrence frequency is low, namely, the event belonging to the category (II) shown in FIG. 1, that is, the "low frequency event" shown in FIG. 3. On the other hand, in the probability determination process, it is determined whether or not the event detected by the event detection unit 50 corresponds to an event whose occurrence probability is low, namely, the event belonging to the category (III) shown in FIG. 1, that is, the "low probability event" shown in FIG. 3.

A large number of data regarding the impediment events are accumulated in the center 44. Moreover, a threshold used for determining whether the impediment event is the low frequency event and a threshold used for determining whether the impediment event is the low probability event are stored in the center 44. The threshold is a limit value of the occurrence frequency or the occurrence probability that a general driver feels the determination-target event unexpected. The unexpected event determination unit 54 analyzes a large number of data to calculate the occurrence frequency and the occurrence probability of the impediment event being the determination-target event, and then compares the occurrence frequency and the occurrence probability with the above-mentioned thresholds, respectively, to execute the frequency determination process and the probability determination process.

The data regarding the impediment event detected by the event detection unit 50 is supplied also to a stress event determination unit 56. The uploaded data from the assisted vehicle 24 also is supplied to the stress event determination unit 56 through a communication unit 58. The stress event determination unit 56 executes a stress level determination process that determines whether or not the event detected by the event detection unit 50 corresponds to the stress event (see FIGS. 1 and 2) for the assisted vehicle 24.

Various rules (maps and the like) for calculating a stress level for each impediment event are stored in the center 44. For example, regarding the "tailgating vehicle", a rule for calculating the stress level based on parameters such as a frequency of tailgating by the tailgating vehicle, degree of tailgating (calculated based on the speed and the inter-vehicle distance), and a distance between the tailgating vehicle and the assisted vehicle 24 is stored. Regarding the "self-paced low-speed vehicle" and the "cutting-in vehicle", a rule for calculating the stress level based on parameters such as a frequency of the impediment action by the vehicle, degree of the impediment action, and a distance between the vehicle and the assisted vehicle 24 is stored. Regarding the on-road fixed object such as the narrow road, a rule for calculating the stress level based on a map data including parameters such as a road width, a difference in the road width at a position where the road width changes, presence or absence of a guardrail is stored. Furthermore, a threshold being a limit value of the stress level that a general driver feels intolerable is stored in the center 44. The stress event determination unit 56 calculates the stress level of each event and compares the calculated stress level with the above-mentioned threshold to execute the stress level determination process.

Furthermore, the data regarding the impediment event detected by the event detection unit 50 is supplied also to an event information calculation unit 74. The event information calculation unit 74 executes a certainty level calculation process with respect to each impediment event provided. The data uploaded from the information providing vehicle and the like to the center 44 include not only data regarding an event confirmed by the on-vehicle camera and the like but also data regarding an event that is not yet confirmed (e.g. the avoidance action of the information providing vehicle 10). In the certainty level calculation process, such the uploaded data are used to calculate a certainty level of the impediment event detected by the event detection unit 50.

The certainty level is calculated based on the number, a rate, and contents of the uploaded data regarding the determination-target event. For example, when a data indicating the avoidance action is uploaded from the information providing vehicle 10 running at a certain location, it is possible to estimate that some impediment event is occurring at the certain location. When lots of data indicating the same kind of avoidance action are uploaded from a large number of information providing vehicles 10, it is possible to judge that an existing probability of the impediment event is high. As a rate of the avoidance action taken by the information providing vehicles 10 running at the certain location becomes higher, the existing probability can be judged to be higher. If the uploaded data include a data that identifies the impediment event itself such as a separated wheel and a disabled vehicle, it is possible to judge that the impediment event is almost certainly occurring at that location.

As to the stress event such as the tailgating vehicle and the manner violation vehicle, the certainty level can be calculated based on the number, rate, contents of the uploaded data. For example, when lots of uploaded behavior data regarding a certain vehicle indicate a tailgating behavior, it is possible to judge that the certain vehicle is probably the tailgating vehicle. As the rate of the tailgating behavior by the certain vehicle becomes higher, it is possible to judge that the probability that the certain vehicle is the tailgating vehicle is higher. When the tailgating behavior itself is detected by an on-vehicle camera and the like, it is possible to judge that the certain vehicle is almost certainly the tailgating vehicle.

In this manner, the certainty level of the impediment event detected by analyzing a large number of data can be calculated based on the number of data suggesting its presence, the rate of data suggesting its presence, and the contents of the data. The event information calculation unit 74 holds a calculation rule (function or map) for calculating the certainty level depending on parameters including the number, rate, and contents of uploaded data, with respect to each impediment event. According to the calculation rule, the certainty level is calculated to be a higher value as an existing probability of the impediment event being the determination-target becomes higher.

Furthermore, the event information calculation unit 74 executes a detailed analysis process. In the detailed analysis process, processes for obtaining detailed information regarding the impediment event detected by the event detection unit 50 are executed. According to the present embodiment, in the center 44, detailed items are defined with respect to each impediment event. For example, in a case of an fallen object on a road as the impediment event, the following four detailed items are defined.

1. position in longitudinal direction (here, the "longitudinal direction" means a cruising direction of the travel route)
2. position in lateral direction (here, the "lateral direction" means a width direction of the travel route)
3. type
4. size In the detailed analysis process, the data stored in the traffic information database 48 are first organized into item data regarding each of the detailed items. Subsequently, the item data are analyzed to derive the analysis result regarding each of the detailed items. Moreover, the confidence level of each analysis result derived is calculated.

Figure 5:
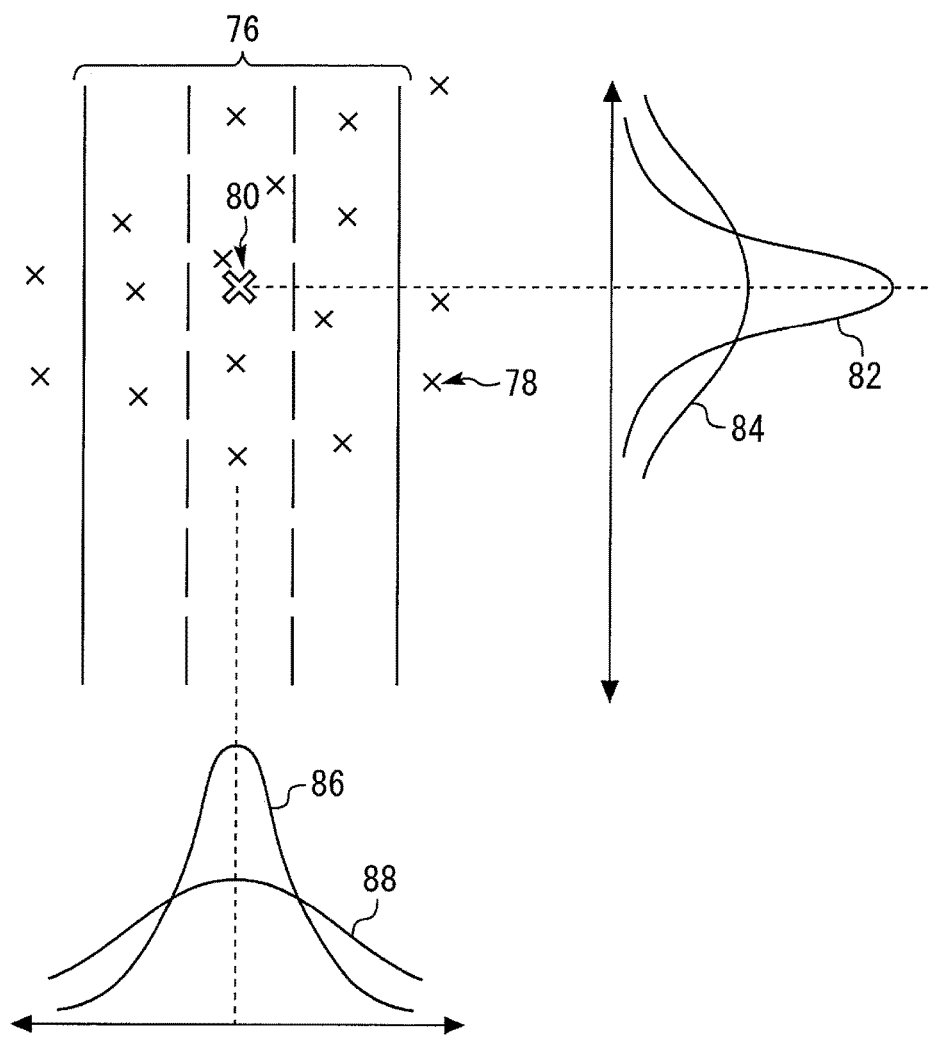
FIG. 5 is a diagram for explaining a summary of an example of item data which an event information calculation unit shown in FIG. 1 uses as basis in a detailed analysis process.

FIG. 5 shows an example of the item data regarding the detailed item "position". In FIG. 5, a region denoted by a reference numeral 76 is a part of a road on the travel route of the assisted vehicle 24. A plurality of X marks 78 in the region 76 respectively indicate coordinates corresponding to the positional information (hereinafter referred to as "positional information 78") regarding the impediment event uploaded from a large number of information providing vehicles 10 that have run through the region 76. An outlined X mark 80 in the region 76 indicates a coordinate corresponding to an average value (hereinafter referred to as an "average value 80") of all the positional information 78.

Numerical information representing the position in the longitudinal direction and numerical information representing the position in the lateral direction can be read from the positional information 78. In FIG. 5, distribution curves 82 and 84 regarding the position in the longitudinal direction are shown on the right side of the region 76. The distribution curve 82 represents a case of a small variation, while the distribution curve 84 represents a case of a large variation. Similarly, distribution curves 86 and 88 regarding the position in the lateral direction are shown on the lower side of the region 76. The distribution curve 86 represents a case of a small variation, while the distribution curve 88 represents a case of a large variation.

Regarding a set of data such as the above-mentioned positional information 78, it is possible to calculate an average value. In the detailed analysis process, a coordinate specified by an average value of the distribution in the longitudinal direction and an average value of the distribution in the lateral direction is recognized as the above-mentioned "average value 80". Since the position of the assisted vehicle 24 is known, a "distance" between the assisted vehicle 24 and the average value 80 can be calculated in the center 44 when the coordinate of the average value 80 is obtained. In the detailed analysis process, the calculated "distance" is used as the analysis result regarding the detailed item "position in longitudinal direction". Moreover, by comparing the coordinate of the average value 80 with the map data, the center 44 can identify a lane to which the average value 80 belongs among a plurality of lanes included in the region 76. In the detailed analysis process, the identified "lane" is used as the analysis result regarding the detailed item "position in lateral direction".

Furthermore, regarding the set of data forming the distribution, it is possible to calculate a variation level of the data. The variation level is exemplified by the following dispersion V or a standard deviation σ.

$$V=\{(x1-m)^2+(x2-m)^2+\ldots+(xN-m)^2\}/N \quad (1)$$

$$\sigma=\sqrt{V} \quad (2)$$

Here, x1 to xN are respective numerical values of data belonging to the distribution, m is an average value of the data, and N is a total number of the data.

When a sufficient number of item data regarding the detailed item is collected, the item data generally form a normal distribution. In the case of the set of data forming the normal distribution, the dispersion V and the standard deviation σ become smaller as a peak of the normal distribution becomes steeper. Since a fact with regard to the detailed item is one, it is possible to judge that the average value is more likely to match the fact as the peak of the normal distribution becomes steeper. Therefore, in the detailed analysis process, the dispersion V or the standard deviation σ is calculated with respect to each of the detailed items. Then, the confidence level of the analysis result for each detailed item is calculated based on the dispersion V or the standard deviation σ. The confidence level is calculated to be a higher value as the dispersion V or the standard deviation σ becomes smaller. According to this calculation method, it is possible to calculate the confidence level to be consistent with the possibility that the average value 80 represents the fact.

The detailed items in the present embodiment include one such as "type" of the target event where the corresponding uploaded data are not quantified. For example, regarding the detailed item "type", data indicating "pedestrian", "vehicle", "animal", "metal", "wood", "cardboard box" and the like are uploaded. Then, the most dominant data among the collected data regarding the detailed item "type" is used as the analysis result regarding the detailed item "type", instead of the average value 80 in the case of the detailed item "position". Moreover, in the present embodiment, non-numerical data such as the type is beforehand associated with a numerical value. Then, regarding a distribution of such the non-numerical data, the variation level is calculated by using the following equation (3) instead of the above-mentioned equation (1)

$$\text{variation level}=(N-n)*\alpha \quad (3)$$

Here, N is a total number of data, n is a number of the item data adopted as the analysis result, and a is a constant. According to this method, it is possible to calculate the analysis result and the confidence level with regard to the detailed item where the non-numerical data are uploaded, similarly to a case of the detailed item where the numerical data are uploaded.

The analysis result and the confidence level for each detailed item as well as the certainty level calculated by the event information calculation unit 74 are provided to a notification decision unit 60. In addition to them, the data of the event that is judged by the unexpected event determination unit 54 as the unexpected event and the data of the event that is judged by the stress event determination unit 56 as the stress event also are supplied to the notification decision unit 60. Based on the certainly level of the event, the notification decision unit 60 performs a notify/not-notify process that is a final judgment on whether or not to execute notifying. If it is judged to execute notifying, then an HMI specification determination process that determines how to perform the notifying is executed based on the analysis result and the confidence level regarding the detailed items of the event.

More specifically, in the notify/not-notify process, it is judged whether the certainty level of the impediment event being the determination-target is equal to or greater than an assistance threshold. If the certainty level is equal to or greater than the assistance threshold, then it is judged that the notification regarding the impediment event of the current cycle is to be notified to the driver. On the other hand, if the certainty level is less than the assistance threshold, then it is judged that the notification is likely to result in misinformation and should not to be notified. When receiving the misinformation, the driver of the vehicle finds it annoying, which decreases reliance on the notification. It is therefore desirable not to notify the event which does not have a certain degree of the certainty level. According to the notify/not-notify process mentioned above, it is possible to effectively prevent such the problem from occurring.

To avoid misinformation is required also in determining whether or not to include the analysis result regarding the detailed items in the notification. Thus, according to the HMI specification determination process in the present embodiment, it is judged whether or not the confidence level of the analysis result is equal to or greater than a confidence threshold with respect to each of the detailed items regarding the impediment event that is judged to be notified to the driver. Then, the contents of the notification are so generated as to include only the analysis result whose confidence level is equal to or greater than the confidence threshold.

FIG. 6 shows an example of the notification in a case where the confidence level exceeds the confidence threshold in three detailed items (position in longitudinal direction, position in lateral direction, and type of target event) among the above-mentioned four detailed items. In this case, a voice notification such as "There is a cardboard box in a first lane 500 meters ahead" is provided and an image in which a cardboard box exists in a first lane ahead is displayed on a head-up display (HUD).

FIG. 7 shows an example of the notification in a case where the confidence level does not exceed the confidence threshold in any of the above-mentioned four detailed items. In this case, a simple voice notification such as "There is an obstacle ahead" is provided and only a trouble mark is displayed on the HUD.

As described above, according to the processes of the present embodiment, the contents of the notification can be changed based on the confidence level of the detailed items with respect to each of the impediment event to be notified. According to such the method, it is possible to notify the driver of the detailed information as much as possible while eliminating the misinformation as much as possible.

The notification decision unit 60 not only generates the contents of the notification by the above-described method but also generates, as appropriate, an instruction of the avoidance control for coping with the contents of the notification. The notification and the instruction of the avoidance control are supplied to the assisted vehicle 24 through the communication unit 62. When receiving them, the assisted vehicle 24 executes a necessary avoidance control in the control unit 40 and uses the vehicle HMI unit 42 to provide the driver with the notification regarding the impediment event.

Operation in First Embodiment

Figure 8:
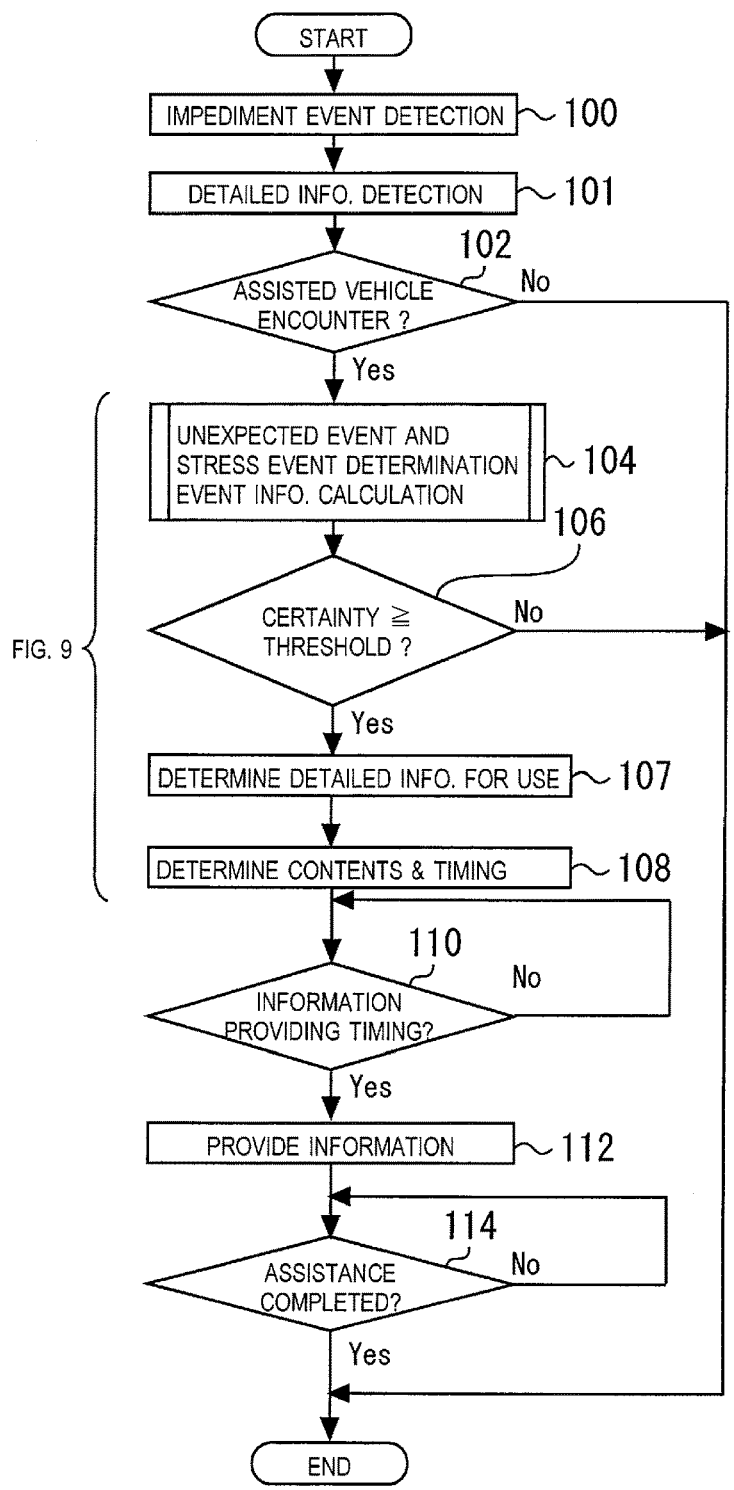
FIG. 8 is a flow chart of a routine executed in the first embodiment of the present invention.

FIG. 8 is a flow chart for explaining an overview of processes executed in the center 44 in the first embodiment of the present invention. It should be noted that the process of recording the uploaded data from the information providing vehicle and the like in the traffic information database 48 is executed separately from a routine shown in FIG. 8.

In the routine shown in FIG. 8, a process of detecting the impediment event is first executed (Step 100). More specifically, an event that is potentially the unexpected event or the stress event is detected based on the data recorded in the traffic information database 48. The process at the present Step 100 corresponds to the above-mentioned (1) and (2) processes executed by the event detection unit 50 shown in FIG. 4.

After the event that is potentially the impediment event is detected, detailed information related to each of the detailed items defined with respect to the impediment event is read out from the traffic information database 48 (Step 101).

After the above-mentioned processes are completed, whether or not the assisted vehicle 24 potentially encounters the impediment event detected in the current cycle is determined (Step 102). More specifically, a location of the impediment event is first identified based on the positional information recorded in the traffic information database 48. Next, a travel route of the assisted vehicle 24 is estimated based on the uploaded data from the assisted vehicle 24. If the travel route of the assisted vehicle 24 potentially overlaps the location of occurrence of the impediment event, the determination at the present Step 102 results in "YES". These processes correspond to the above-mentioned (3) to (5) processes executed by the event detection unit 50 shown in FIG. 4.

If the determination at Step 102 results in "NO", then the processing in the current cycle is ended and the process of the above-mentioned Step 100 is started again. On the other hand, if it is judged that the impediment event is potentially encountered by the assisted vehicle 24, then the processes by the unexpected event determination unit 54, the stress event determination unit 56 and the event information calculation unit 74 are executed (Step 104). More specifically, the following four processes are executed here.

1. determining whether or not the impediment event detected in the current cycle corresponds to the unexpected event that is to be notified to the driver.

2. determining whether or not the impediment event detected in the current cycle corresponds to the stress event that is to be notified to the driver.

3. calculating the certainty level of the impediment event detected in the current cycle.

4. calculating the analysis result and the confidence level regarding the detailed items defined with respect to the impediment event detected in the current cycle.

Figure 9:
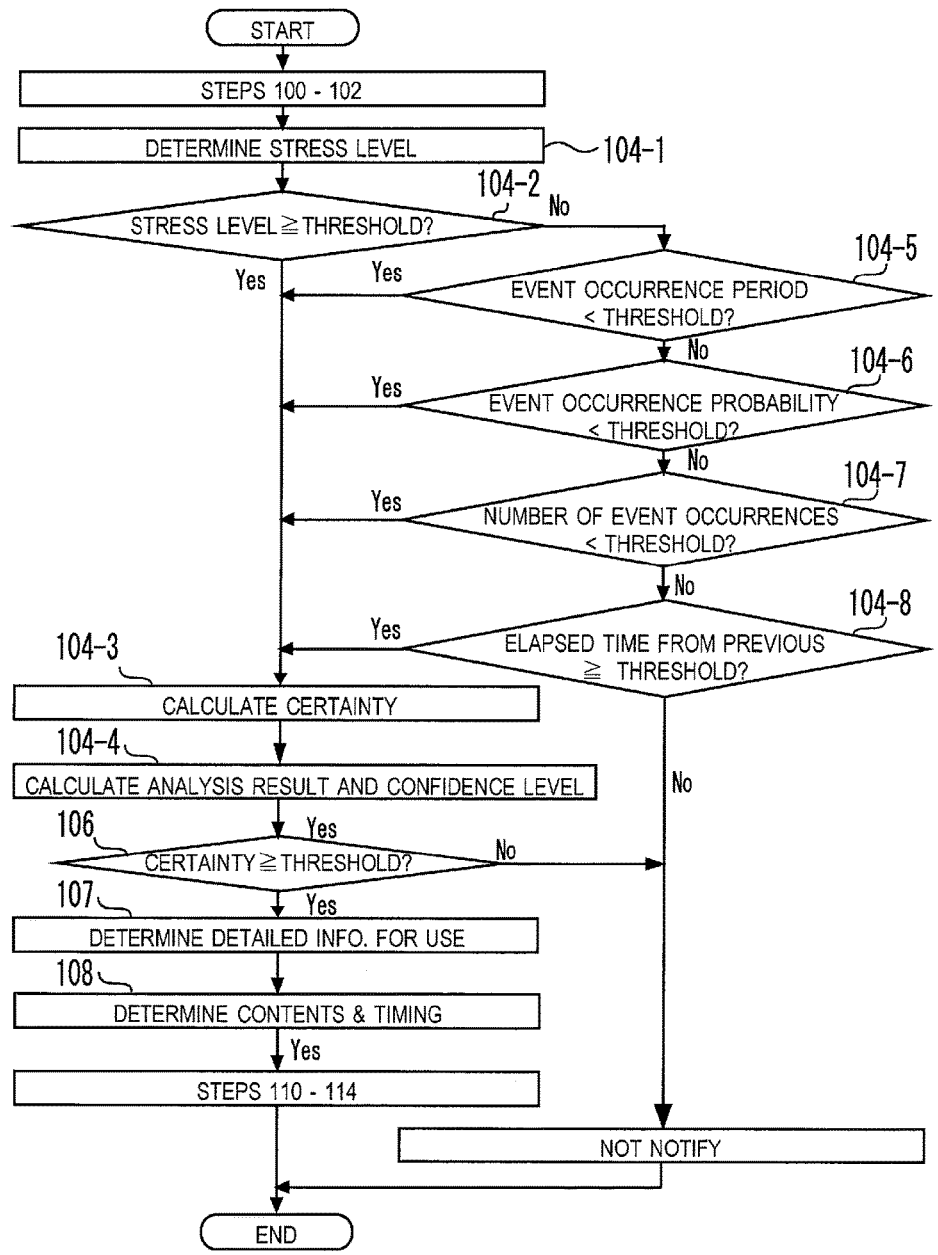
FIG. 9 is a flow chart for explaining details of Steps 104 and 106 shown in FIG. 8.

FIG. 9 is a flow chart for explaining details of characteristic processes of the present embodiment including the above-mentioned Step 104. As shown in FIG. 9, at Step 104, the stress level of the impediment event being the determination-target is first determined (Step 104-1). As described above, various rules (maps and the like) for calculating the stress level for each impediment event are stored in the center 44. The stress level of the impediment event is determined according to the rule.

After the process at Step 104-1 is completed, it is determined whether or not the determined stress level is equal to or greater than the threshold for determining notification necessity (Step 104-2). As described above, the threshold of the stress level for each impediment event is stored in the center 44. At the present Step 104-2, the above-mentioned stress level is compared with the threshold for the impediment event being the determination-target.

If it is determined that the stress level is equal to or greater than the threshold, it is possible to judge that the impediment event being the determination-target corresponds to the stress event that should be notified to the driver. In this case, the certainty level of the impediment event is calculated (Step 104-3). More specifically, the following processes are executed here.

1. counting the number of the uploaded data regarding the target impediment event.

2. calculating the rate of uploads of the data regarding the target impediment event from the information providing vehicles 10 passing through the location of occurrence of the target impediment event.

3. counting the number of uploads of data sufficient for identifying the contents of the target impediment event.

4. multiplying the results of the above-mentioned processes 1 to 3 by preset weighting coefficients, respectively.

5. calculating a sum of the respective results of the above-mentioned process 4 as the certainty level.

If there exists an impediment event, the number and rate of the data suggesting its existence increase as time proceeds. Moreover, information enough to confirm the existence of the impediment event is expected to be uploaded. On the other hand, if no impediment event exists, such the data is not uploaded so much even with the passage of time. Therefore, according to the processing in Step 104-3, it is possible to calculate the certainty level that converges to the existing probability of the impediment event as time proceeds.

After the process at Step 104-3 is completed, the analysis result and the confidence level regarding the detailed items defined with respect to the impediment event detected in the current cycle are calculated (Step 104-4). This process at Step 104-4 corresponds to the detailed analysis process executed by the event information calculation unit 74 shown in FIG. 4. Here, the item data for each detailed item with regard to the impediment event being the analysis target is first generated. Subsequently, the analysis result and the variation level for each detailed item are calculated by using the item data. The confidence level regarding each detailed item is calculated based on the variation level. When such the calculation is completed for all of the detailed items defined with respect to the impediment event in the current cycle, the process at Step 104-4 is completed.

If it is determined at the above-mentioned Step 104-2 in the routine shown in FIG. 9 that the stress level of the target impediment event is less than the threshold, then it is determined whether or not the target impediment event satisfies a first condition of the low frequency event, namely, a condition that "the period of event occurrence within a defined period of time is less than a threshold" (Step 104-5). In the center 44, statistical processing with regard to the time of occurrence of the impediment event is performed based on the large amount of data accumulated. The above-mentioned "defined period of time" is exemplified by one year, one month, one week, and so forth. The above-mentioned "threshold" is set in consideration of the "defined period of time" and is set to be sufficiently shorter than the "defined period of time". If the target impediment event is the one that occurs in a limited period (specific season, period, or hour, for example) within the defined period of time, it is determined in the present Step 104-5 that the above-mentioned first condition is satisfied.

If it is determined that the first condition is satisfied, it is possible to judge that the target impediment event corresponds to the low frequency event that should be notified to the driver. In this case, thereafter, the certainty level is calculated at Step 104-3 and the detailed analysis process is performed at Step 104-4. On the other hand, if it is determined that the above-mentioned first condition is not satisfied, then it is determined whether or not the target impediment event satisfies a condition of the low probability event (Step 104-6). More specifically, it is first determined whether or not the target impediment event occurs in an on-road fixed object belonging to a population being a group of the same kind of objects. If the determination results in "YES", then it is determined whether or not a probability of the on-road fixed object causing the impediment event is less than a threshold. The threshold is an upper limit value of a range of the probability in which a general driver has a preconceived idea that the on-road fixed object seldom causes the impediment event. For example, the threshold is set to 10%, 5%, 3%, or 1%.

If the determination at the above-mentioned Step 104-6 results in "YES", it is possible to judge that the target impediment event corresponds to the low probability event that should be notified to the driver. In this case, the processes of Step 104-3 and Step 104-4 are executed thereafter. On the other hand, if the determination at Step S104-6 results in "NO", then it is determined whether or not the target impediment event satisfies a second condition of the low frequency event, namely, a condition that "the number of event occurrences within a defined period of time is less than a threshold" (Step 104-7). In the center 44, statistical processing with regard to the number of occurrences of the impediment event is performed based on the large amount of data accumulated. The above-mentioned "defined period of time" is exemplified by one year, one month, one week, and so forth. The above-mentioned "threshold" is set in consideration of the "defined period of time" and is set to be one to several times.

If it is determined at the above-mentioned Step 104-7 that the above-mentioned second condition is satisfied, it is possible to judge that the target impediment event is not the one occurring routinely but corresponds to the low frequency event that should be notified to the driver. In this case, the processes of Step 104-3 and Step 104-4 are executed thereafter. On the other hand, if the determination at Step S104-7 results in "NO", then it is determined whether or not the target impediment event satisfies a third condition of the low frequency event, namely, a condition that "an elapsed time from the previous occurrence at the location of occurrence is equal to or more than a threshold" (Step 104-8). The location, date and time of occurrence of individual impediment event are recorded in the center 44. The above-mentioned determination at Step 104-8 is made based on such the record. The threshold used in the present Step 104-8 is exemplified by several years, one year, one month, and so forth.

If the determination at the above-mentioned Step 104-8 results in "YES", it is possible to judge that the target impediment event corresponds to the low frequency event that should be notified to the driver. In this case, the processes of Step 104-3 and Step 104-4 are executed thereafter. On the other hand, if the determination at Step S104-8 results in "NO", it is possible to judge that the target impediment event is not the event that should be notified to the driver. In this case, the center 44 makes a final decision that the event is not to be notified, and then ends the processes of the current cycle.

In the routine shown in FIG. 9, after Step 104-4, it is determined next whether or not the certainty level calculated at Step 104-3 is equal to or greater than an assistance threshold (Step 106). This process corresponds to the above-mentioned notify/not-notify process executed by the notification decision unit 60. Here, the assistance threshold is a minimum certainty level (for example, 30%) that is required for providing the driver of the assisted vehicle 24 with the euphemistic notification. If the certainty level of the impediment event is less than the assistance threshold, then the center 44 makes a final decision that the impediment event is not to be notified, and then quickly ends the processes of the current cycle.

On the other hand, if it is determined at the above-mentioned Step 106 that the certainty level of the impediment event is equal to or greater than the assistance threshold, then the center 44 makes a final decision that the impediment event in the current cycle deserves to be notified. In this case, information of the detailed items used in the notification is subsequently determined based on the result of the detailed analysis process executed at Step 104-4 (Step 107). More specifically, the analysis result whose confidence level is equal to or greater than the confidence threshold is picked up.

Next, the picked-up analysis results and so forth are used to determine the contents of assistance provided to the assisted vehicle 24 and a timing of the provision (Step 108). The center 44 stores a rule for generating, depending on a combination of the picked-up analysis results, the notification including the picked-up analysis results, with respect to each impediment event. In the present Step 108, the notification to be provided to the driver is generated in accordance with the rule. Moreover, an instruction of the avoidance control associated with the notification is generated as appropriate. Moreover, a timing of providing the notification and the like is determined based on a distance between the present location of the assisted vehicle 24 and the location of occurrence of the impediment event, a speed of the assisted vehicle 24, and so forth.

After the above-mentioned processes are completed, processes of Step 110 and thereafter shown in FIG. 8 are executed. It is first determined whether or not the timing of providing the notification comes (Step 110). This process is executed repeatedly until the timing comes. When the timing comes, the notification and information required for the avoidance control are provided from the center 44 to the assisted vehicle 24 (Step 112). After that, the center 44 executes and completes the other processes necessary for the assistance (Step 114), and then ends the processes of the current cycle.

According to the system of the present embodiment, as described above, it is possible to appropriately notify the assisted vehicle 24 of only the information regarding the impediment event that the driver finds useful. Moreover, according to the present system, the analysis result regarding the detailed item whose confidence level is high is utilized, which makes it possible to provide the assisted vehicle 24 with only the detailed information that can assure high reliability. Therefore, according to the present system, it is possible to fully provide the driver of the assisted vehicle 24 with the notification useful for continuing safety driving of the assisted vehicle 24, without losing the driver's trust.

In the above description, the processes from Step 100 to Step 114 are executed in series. However, the method of executing the processes is not limited to that. The processes can be executed in a different order or in parallel, depending on specification of hardware.

Modification Examples of First Embodiment

In the first embodiment described above, all the processes for determining the contents and timing of the notification are performed on the side of the center 44. Instead, a part of the processes may be performed on the side of the assisted vehicle 24.

In the first embodiment described above, all the information is accumulated in the database of the center 44. However, the method of storing information is not limited to that. For example, a part of the information can be stored in the vehicle.

In the first embodiment described above, the confidence level regarding the detailed item is determined based on the variation level of the item data. However, a method of determining the confidence level is not limited to that. Certainty of the analysis result derived from the item data becomes higher as the number of data increases. Therefore, the confidence level can be determined based on the number of data included in the item data, in addition to the variation level or instead of the variation level.

In the first embodiment described above, the item data include plural types of data respectively having different reliabilities. For example, the positional information obtained from the locator is higher in accuracy than the positional information obtained from the GPS device. As another example, the positional information corrected by using a function of an on-vehicle camera that recognizes white lines on the road is higher in accuracy than the positional information without such the correction. Regarding the positional information, the data of high accuracy is higher in reliability than the data of low accuracy. Regarding the size of the obstacle, a first data obtained by merely analyzing an image obtained by the on-vehicle camera is lower in reliability than a second data obtained by further reflecting a measurement result by a laser radar in the first data. In the first embodiment described above, all the item data are equally treated in determining the confidence level. Alternatively, it is also possible that the item data is given reliability depending on the data type, and weighting according to the reliability is applied to determination of the confidence level.

By the way, in the first embodiment described above, the processor, the storage device, the communication device and so forth of the center 44 constitute the "data processing device" in the first invention. Moreover, the frequency of occurrence, the probability of occurrence, and the stress level of the impediment event correspond to the "notification necessity level" in the fifth invention.

Second Embodiment

Figure 10:
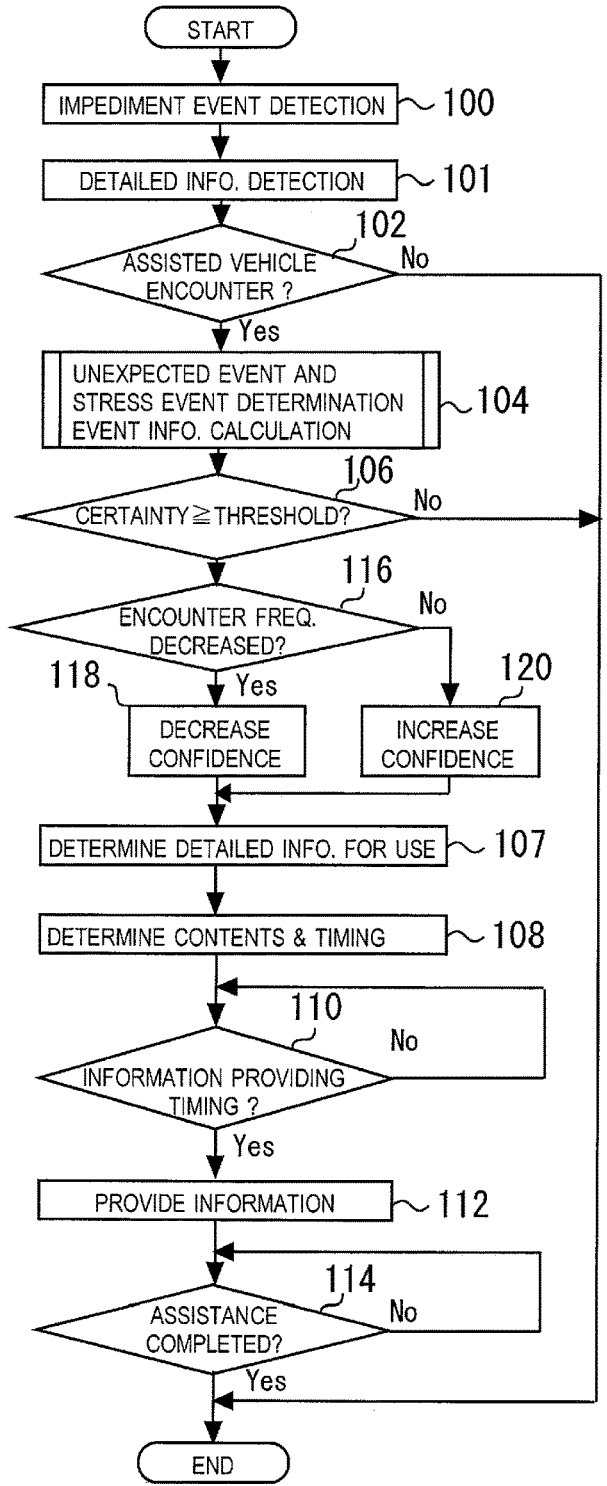
FIG. 10 is a flow chart of a routine executed in a second embodiment of the present invention.

Next, a second embodiment of the present invention will be described with reference to FIG. 10. FIG. 10 is a flow chart for explaining contents of processes executed by the center 44 according to the present embodiment. The system of the present embodiment can be achieved by causing the center 44 shown in FIG. 4 to execute the processes shown in FIG. 10 instead of the processes shown in FIG. 8. The processes shown in FIG. 10 are the same as the processes shown in FIG. 8 except that Steps 116 to 120 are inserted after Step 106. Hereinafter, an overlapping description of the same components as in the first embodiment will be omitted or simplified, and features of the present embodiment will be described.

Features of Second Embodiment

In the system according to the present embodiment, when the impediment event is detected, the notification including the analysis result whose confidence level is high is provided to the driver of the assisted vehicle 24, as in the case of the first embodiment. In the above-described first embodiment, the confidence level is calculated based on parameters such as the variation level of the item data, the number of item data, and the reliability of the item data. The confidence level calculated by this method correctly reflects the certainty of the analysis result, as long as the impediment event continues to exist. However, if the impediment event disappears due to its movement or the like, the analysis result is no longer correct, but the confidence level of the analysis result still remains high. In consideration of this problem, according to the present embodiment, influence of the movement and the like caused in the impediment event is correctly reflected in the confidence level by using the following method.

Operation in Second Embodiment

In the flow shown in FIG. 10, if it is determined at Step 106 that the certainty level of the impediment event is equal to or greater than the assistance threshold, then it is determined whether or not the frequency of encounter regarding the impediment event is decreased (Step 116). In the present embodiment, once the center 44 recognizes an impediment event, the center 44 thereafter monitors the frequency of encounter regarding the impediment event until it is judged that the impediment event has disappeared. Here, the "frequency of encounter" means the number of information suggesting the encounter and uploaded within a certain period of time. At the present Step 116, with regard to the impediment event being the determination-target, the past frequency of encounter and the latest frequency of encounter are read. Then, the both are compared with each other to determine whether or not the frequency of encounter is decreased.

If it is determined that the frequency of encounter is decreased, it is possible to judge that the impediment event is likely to have disappeared due to movement or the like. In this case, it is possible to judge that the analysis result that has been obtained with regard to the impediment event is likely to be inconsistent with the current situation. Therefore, in this case, the confidence level that has been calculated at Step 104 (see Step 104-4 shown in FIG. 9) is modified to decrease (Step 118).

On the other hand, if it is determined at Step 116 that the frequency of encounter is not decreased, it is possible to judge that the impediment event continues to exist at the same position. In this case, the existing probability of the impediment event further increases, and thus the confidence level of the analysis result can also be increased further. Accordingly, in this case, the confidence level that has been calculated at Step 104 is modified to increase (Step 120).

According to the processes described above, it is possible to correctly reflect the existence state of the impediment event in the confidence level of the analysis result. Therefore, according to the present embodiment, even when the state of the impediment event changes as time goes by, it is possible to fully provide the driver of the assisted vehicle 24 with the notification useful for continuing safety driving of the assisted vehicle 24, without losing the driver's trust.

Modification Examples of Second Embodiment

In the second embodiment described above, the confidence level is modified on the basis of the frequency of encounter regarding the impediment event, in order to reflect the change in the state of the impediment event in the confidence level. However, the basis used for modifying the confidence level is not limited to the frequency of encounter. For example, it is also possible that a move possibility of the impediment event is calculated and the confidence level is decreased as the move possibility becomes higher. As another example, it is also possible that an elapsed time from the previous detection of the impediment event is calculated and the confidence level is decreased as the elapsed time becomes longer.

What is claimed is:

1. An information providing apparatus for a vehicle, comprising:
 a data processing device configured to process a traffic information data to provide a driver of the vehicle with a notification, wherein
 the data processing device is configured to execute:
  an event detection process that detects, based on the traffic information data, an impediment event potentially encountered by the vehicle;
  a notification process that provides the driver with the notification regarding the impediment event;
  a process of performing, based on the traffic information data, an analysis of a detailed item including at least a position of the impediment event;
  a process of generating a confidence level of a result of the analysis of the detailed item; and
  a process of changing, depending on the confidence level, contents to be included in the notification, wherein
 the confidence level is calculated to be a higher value as a number of item data regarding the detailed item becomes larger, wherein
 the data processing device is further configured to calculate a move possibility for each of the impediment event, and
 the confidence level with regard to the detailed item related to a position is calculated to be a lower value as the move possibility of the impediment event becomes higher.

2. An information providing apparatus for a vehicle comprising:
 a traffic information database in which traffic information data are recorded; and
 a data processing device configured to process the traffic information data to provide a driver of an assisted vehicle with a notification, wherein
 the data processing device is configured to execute:
  an event detection process that detects, based on the traffic information data, an impediment event that impediments vehicle running;
  an event extraction process that extracts the impediment event potentially encountered by the assisted vehicle;
  a notification process that provides the driver with the notification regarding the impediment event potentially encountered by the assisted vehicle;
  a process of generating, based on the traffic information data, item data regarding a detailed item defined with respect to the impediment event;
  a process of generating, based on the item data, an analysis result regarding the detailed item and a confidence level of the analysis result; and
  a process of changing, depending on the confidence level, contents regarding the analysis result to be included in the notification
 wherein
 the confidence level is calculated to be a higher value as a number of the item data regarding the detailed item becomes larger, wherein
 the data processing device is further configured to calculate a move possibility for each of the impediment event, and the confidence level with regard to the detailed item related to a position is calculated to be a lower value as the move possibility of the impediment event becomes higher.

* * * * *